Figure 4:
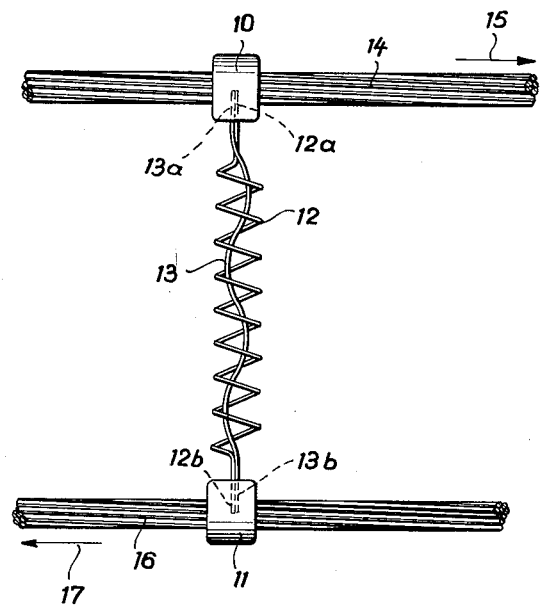

May 1, 1962     M. GERLACH ETAL     3,032,605
SPACER FOR ELECTRICAL CONDUCTORS
Filed Sept. 8, 1958     2 Sheets-Sheet 1
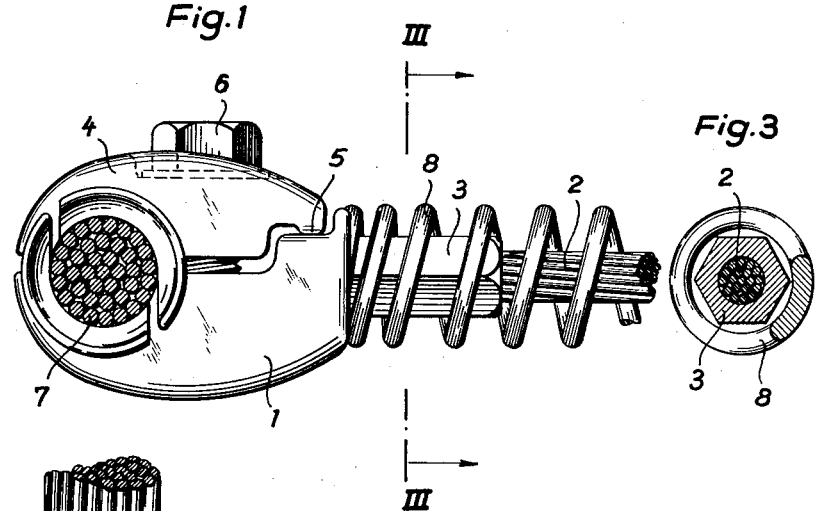
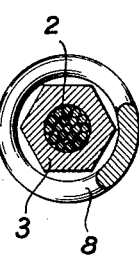
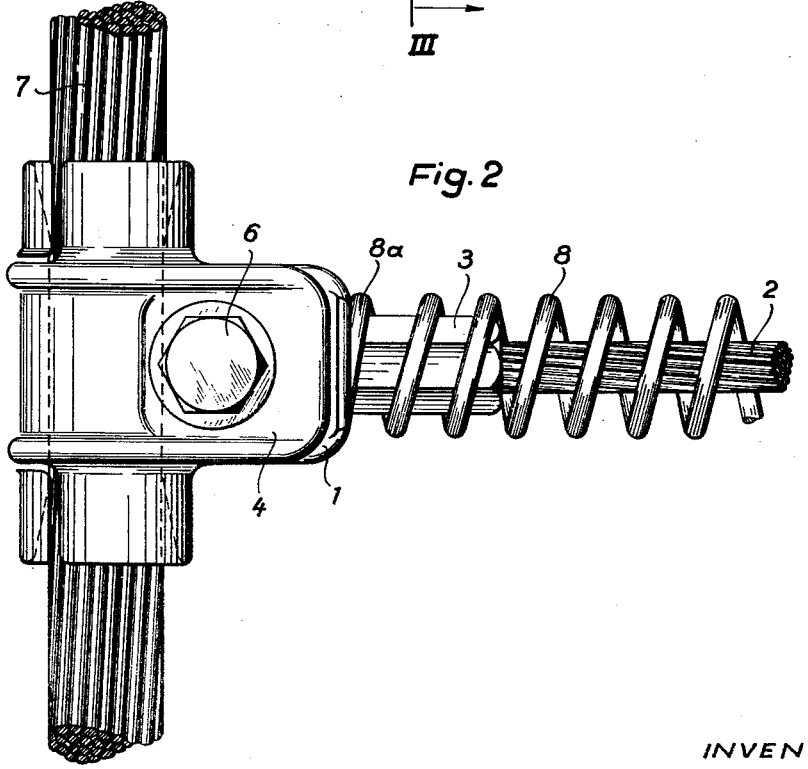
INVENTORS
M. Gerlach
O. Müller
ATTYS.

United States Patent Office 3,032,605
Patented May 1, 1962

3,032,605
SPACER FOR ELECTRICAL CONDUCTORS
Martin Gerlach and Oskar Müller, Nurnberg, Germany, assignors to Firma Bayerische Schrauben- und Federn-Fabriken Richard Bergner, Schwabach, near Nurnberg, Germany
Filed Sept. 8, 1958, Ser. No. 759,724
Claims priority, application Germany Sept. 10, 1957
10 Claims. (Cl. 174—128)

The present invention relates to a spacing device for bunched overhead electric line conductors. Such spacing devices are needed between parallel overhead transmission line conductors of the same phase, suspended at intervals from supports, in order to keep the several (stranded) conductors the required distance apart. Generally, the spacing devices are arranged to permit some relative movement between the conductors both in the longitudinal and in the transverse directions. Such movements may be due to ice or wind as well as to electrical accidents.

Known spacing devices for bunched electrical conductors consist of a length of wire rope with clamping means at each end for attachment to the conductors. Such spacers are of very simple construction. Since the purpose of the wire rope is, on the one hand, to prevent the conductors from moving further apart and, on the other, to prevent or at least resist their moving closer together, the rope must be fairly rigid. The use of a steel wire rope has therefore been recommended in the case of a known type of spacer.

However, when short circuit currents flow through such conductors the latter may attract each other with considerable force, sufficient to cause the lengths of wire rope to be bent. Rigid wire ropes may even be permanently deformed and then prevent the conductors from resuming their prescribed relative spacing. If such occurrences happen repeatedly the wire rope may fail altogether. Moreover, relative longitudinal displacement of the line conductors due for instance to differential ice and snow loads will cause the wire rope to be bent into S-shape and this may also lead to the permanent deformation and possible failure of the rope.

The present invention overcomes these objections by employing wire ropes that are flexible and at the same time by providing springs in addition to the ropes to prevent the conductors from moving closer together. The above described relative movements of the conductors cannot cause damage to a rope that is flexible. Whereas excessive spacing of the conductors is just as effectively prevented by a flexible, and naturally sufficiently tensile, rope, as by a rigid one, any tendency of the conductors to move too close together is counteracted by the presence of the proposed spring which also restores the conductors to their prescribed positions whenever they have been forced closer together against the resistance of the spring.

According to the circumstances of the individual case it may be an advantage if the springs have some compressional bias when the wire ropes are quite taut, or alternatively if the ropes are still slack when the springs are completely relaxed, in such manner that the conductors can move further apart from their normal position by expanding the springs.

The former arrangement prevents the normal distance between the conductors from ever being exceeded, and also offers a strong resilient resistance to any reduction of this distance, and will therefore be preferred in cases where these effects are required. The latter arrangement will be preferred if the conductors are expected to be subject to frequent or considerable lengthwise displacement. The construction of the spacing device in the manner proposed by the invention will then permit such lengthwise displacement to take place until the flexible rope is taut without any reduction in the spacing of the conductors, a possibility which for electrical reasons must be regarded as especially desirable since the aim is to maintain the same spacing between all the conductors.

In spacing devices for copper conductors it is preferred to use a bronze or copper rope as a flexible rope, whereas in the case of aluminium or aluminium alloy conductors a rope of non-rusting steel would be principally used.

The accompanying drawings illustrate two embodiments of the invention.

FIGURE 1 is a side view of a spacer constructed according to the invention,
FIGURE 2 is the corresponding plan view,
FIGURE 3 is a section taken on the line III—III in FIGURE 1, and
FIGURE 4 is another embodiment diagrammatically illustrated.

With the help of a sleeve 3 in conventional manner a stranded cable 2 is secured to one half 1 of the clamp of the spacer, for instance by means of a cast lead bond or by a press fit. The second half 4 of the clamp is placed over the bottom half 1, supported by a projecting edge 5 and tightened by means of a screw 6 which engages the bottom half 1 of the clamp. The two halves 1 and 4 of the clamp thus embrace the conductor 7. The other end of the wire rope 2 carries a similar clamp which is not shown in the drawing. The wire rope 2 is surrounded by a helical spring 8 of which one end 8a bears against the half 1 of the clamp, whereas the other end bears against the corresponding half of the other clamp which is not shown in the drawing. Preferably spring 8 has a compressional bias so that the wire rope will normally be taut.

In the embodiment shown in FIGURE 4 the two clamps 10 and 11 are connected by a helical spring 12, each end of the spring being firmly anchored in one of the clamps. The two ends 13a and 13b of the wire rope 13 are likewise firmly anchored in corresponding halves of the clamps in such manner that the rope will be slack when spring 12 is relaxed. Assuming for instance that conductor 14 moves in the direction of arrow 15 to the right or that conductor 16 moves in the direction of arrow 17 to the left, then the spacing of the conductors need not change until the wire rope 13 is taut. At the same time spring 12 will expand because its two ends 12a and 12b are secured to the clamps. The spring will therefore temporarily act as a tension spring. However, should the two conductors 14 and 16 move closer together, then the spring 12 will act as a compression spring, no damage being done to the rope 13 because it is flexible. If the two conductors 14, 16 tend to move further apart, they must overcome the tensile strength of spring 12. The maximum distance between the conductors is determined by the length of wire rope 12.

We claim:
1. An electrical conductor system having two conductors extending parallel to one another and both at the same height, two clamps each rigidly and non-rotatably attached to a respective one of said conductors, a flexible cable extending horizontally between said conductors and having each end rigidly attached to a respective one of said clamps, and a resiliently longitudinally compressible helical spring having turns spaced apart from one another, which spring is disposed outside and round the cable and in contact with each of said clamps and is in a state of compressive stress maintaining said cable in a state of tensile stress.
2. An electrical conductor system having two conductors extending parallel to one another and both at the same height, two clamps each rigidly and non-rotat- ably attached to a respective one of the said conductors, a slack flexible cable extending between said conductors and having each end attached to a respective one of said clamps, and an unstressed resiliently longitudinally compressible spring having turns spaced apart from one another and disposed outside and round the cable and extending horizontally between said clamps, each end of the spring being anchored in a respective one of said clamps.

3. An electrical conductor system having two conductors extending parallel to one another, two clamps each rigidly and non-rotatably attached to a respective one of said conductors, a flexible cable extending between said conductors and having each end rigidly attached to a respective one of said clamps, and a resiliently longitudinally compressible helical spring having turns spaced apart from one another, which spring is disposed outside and round the cable and in contact with each of said clamps and is in a state of compressive stress maintaining said cable in a state of tensile stress.

4. An electrical conductor system having two conductors extending parallel to one another, two clamps each rigidly and non-rotatably attached to a respective one of the said conductors, a slack flexible cable extending between said conductors and having each end attached to a respective one of said clamps, and an unstressed resiliently longitudinally compressible spring having turns spaced apart from one another and disposed outside and round the cable and extending between said clamps, each end of the spring being anchored in a respective one of said clamps.

5. An electrical conductor spacing device comprising two clamps, each rigidly and non-rotatably attachable to an electrical conductor, a flexible cable having each end rigidly attached to a respective one of said clamps, and a resiliently longitudinally compressible helical spring having turns spaced apart from one another, which spring is disposed outside and round the cable and in contact with each of said clamps and is in a state of compressive stress maintaining said cable in a state of tensile stress.

6. An electrical conductor spacing device, comprising two clamps, each rigidly and non-rotatably attachable to an electrical conductor, a slack flexible cable having each end attached to a respective one of said clamps, and an unstressed resiliently longitudinally compressible spring having turns spaced apart from one another and disposed outside and round the cable and extending horizontally between said clamps, each end of the spring being anchored in a respective one of said clamps.

7. An electrical conductor system having two conductors extending parallel to one another, two clamps each rigidly and non-rotatably attached to a respective one of said conductors, a flexible cable extending between said conductors and having each end rigidly attached to a respective one of said clamps, and a helical spring disposed outside and around the cable and in contact with each of said clamps and in a state of compressive stress maintaining said cable in a state of tensile stress.

8. An electrical conductor system having two conductors extending parallel to one another, two clamps each rigidly and non-rotatably attached to a respective one of said conductors, a slack flexible cable extending between said conductors and having each end attached to a respective one of said clamps, and an unstressed resiliently longitudinally extensible spring disposed outside and around the cable and extending between said clamps, each end of the spring being anchored in a respective one of said clamps.

9. An electrical conductor spacing device comprising two clamps, each rigidly and non-rotatably attachable to an electrical conductor, a flexible cable having each end rigidly attached to a respective one of said clamps, and a helical spring disposed outside and around the cable and in contact with each of said clamps and in a state of compressive stress maintaining said cable in a state of tensile stress.

10. An electrical conductor spacing device comprising two clamps, each rigidly and non-rotatably attachable to an electrical conductor, a slack flexible cable having each end attached to a respective one of said clamps, and an unstressed resiliently longitudinally extensible spring disposed outside and around the cable and extending between said clamps, each end of the spring being anchored in a respective one of said clamps.

References Cited in the file of this patent

UNITED STATES PATENTS

| | | |
|---|---|---|
| 810,336 | Higgins | Jan. 16, 1906 |
| 1,566,192 | Forrest | Dec. 5, 1925 |
| 2,117,322 | Hillman | May 17, 1938 |
| 2,361,496 | Pointer | Oct. 31, 1944 |
| 2,937,225 | Kaminski et al. | May 17, 1960 |

FOREIGN PATENTS

| | | |
|---|---|---|
| 279,251 | Great Britain | Oct. 27, 1927 |
| 739,796 | Great Britain | Nov. 2, 1955 |

OTHER REFERENCES

Publication: "Measure S. C. Forces on Spacers" (Malmstrom), published in Electrical World, June 30, 1958; page 45 relied on.